Nov. 8, 1938.   J. E. PETIT   2,136,314
DEVICE FOR EXERTING FRICTIONAL ACTION
Filed Sept. 26, 1935
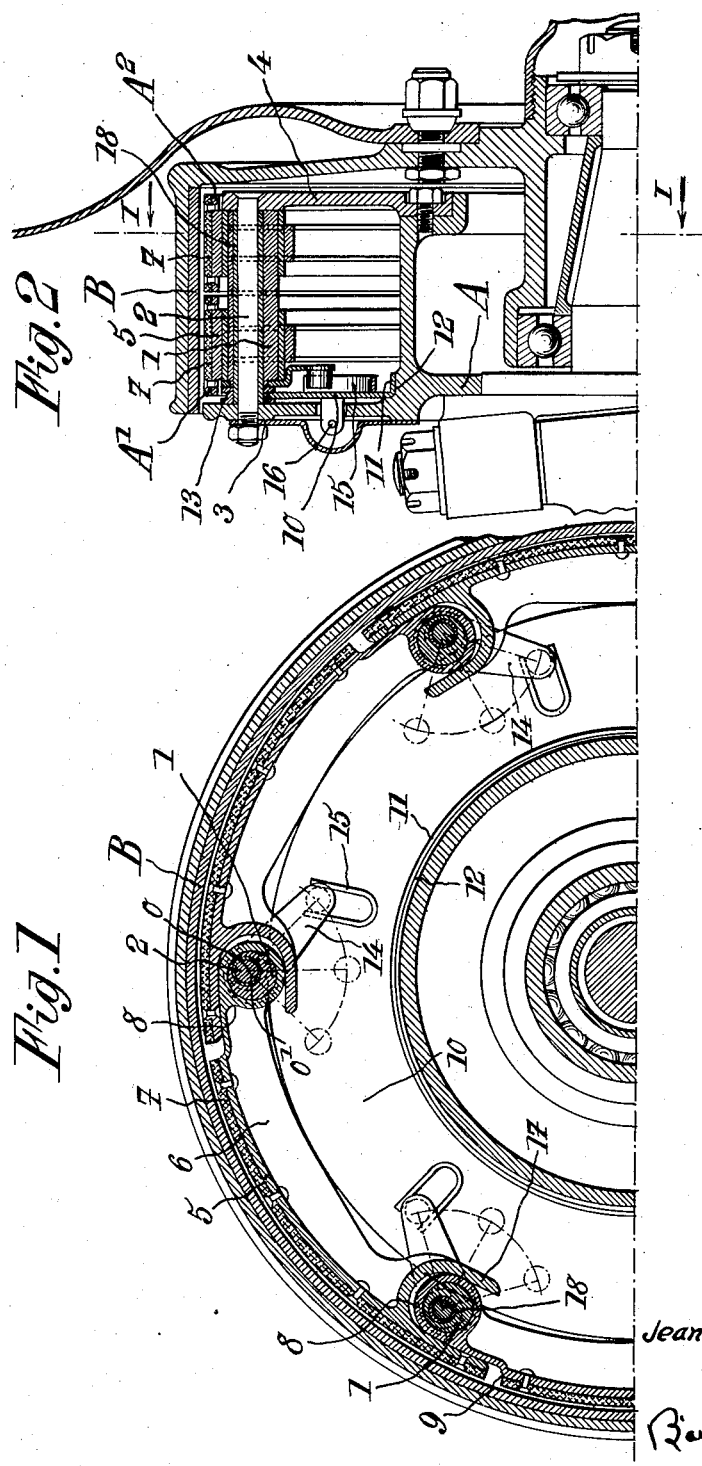
Inventor:
Jean Emile Petit
Attorneys:

Patented Nov. 8, 1938

2,136,314

UNITED STATES PATENT OFFICE 2,136,314

DEVICE FOR EXERTING A FRICTIONAL ACTION

Jean Emile Petit, Levallois-Perret, France

Application September 26, 1935, Serial No. 42,336
In Belgium September 27, 1934

7 Claims. (Cl. 188—78)

The present invention relates to devices, such for instance as brakes or clutches, including two members arranged in rotary relation with respect to each other and capable of being applied against each other when so desired. The invention is more especially, although not exclusively, concerned with braking devices for automobile vehicles.

The object of the present invention is to provide a device of this kind which ensures a better distribution of the stresses transmitted from one member to the other than in devices of the same kind made up to the present time.

According to an essential feature of the present invention, the device, which includes a plurality of segments or shoes carried by a disc rigid with one of said members and capable of being moved toward the surface of the other member, is provided with at least an equal number of kinematic means for controlling the displacements of said segments or shoes, said means being so devised as to distribute the pressure in a uniform manner over the segments or shoes, whereby their linings can be used until they are fully worn, and to exert no deforming action on said surface of the other member.

According to another feature of the present invention, these segments or shoes are arranged in such manner that one of their ends is actuated directly under the effect of the control means, while the other end is moved through the medium of the adjacent segment or shoe, upon which it rests freely, whereby it is possible to obtain a perfect radial expansibility.

Still another feature of the present invention consists in controlling the displacements of the segments or shoes by means of an organ pivotally mounted about the common axis of the two members, this organ being connected to the segments or shoes through suitable kinematic means.

A fourth feature of the present invention consists in devising the kinematic means for connecting the segments or shoes with their control organ in such manner that the radial displacements of said segments or shoes are always proportional to the corresponding displacements of said control organ.

These, and other features of the present invention will appear from the following detailed description of a specific embodiment thereof.

A preferred embodiment of the present invention will be hereinafter described, with reference to the accompanying drawing, given merely by way of example, and in which:

Fig. 1 is a sectional view on the line 1—1 of Fig. 2 of the central portion of an automobile vehicle wheel fitted with a braking device according to the present invention;

Fig. 2 is a corresponding axial sectional view.

The embodiment of the invention that will be hereinafter described concerns, by way of example, a braking device, especially adapted for an automobile vehicle.

This device includes, in the known manner, a plurality of segments or shoes carried by an element or disc A coaxial with the axle of the wheel, but stationary, that is to say not driven angularly together with the wheel, said segments being capable of being brought into frictional engagement with a cylindrical surface B which turns together with the wheel.

According to the present invention, the displacements of said segments or shoes, intended to bring them toward, or away from, surface B, are obtained through kinematic devices (cams, eccentrics, etc.), the number of which is at least equal to the number of segments or shoes, and these devices are arranged to distribute the braking pressure uniformly over the whole surface of the linings carried by said segments or shoes. Owing to this arrangement, these linings can wear in a uniform manner and they can be utilized until nearly wholly worn. These kinematic devices are controlled in any suitable manner, but preferably, as shown in the specific example illustrated by the drawing, they are controlled through an organ mounted pivotally about the axis of the hub of the wheel eventually through a plurality of control organs of this kind, each coacting with one or several of these kinematic means.

I will first describe the arrangement of the segments or shoes and the kinematic means through which they are actuated, respectively.

I preferably make use of a relatively high number of segments or shoes, for instance six, this in order to obtain a good distribution of the braking effort and to have segments or shoes that work through the whole of their surface. Furthermore the surfaces of the segments or shoes may eventually, as shown in the drawing (but not necessarily) be divided into two groups such as $A^1$ and $A^2$.

As for the kinematic means for actuating the segments or shoes, they are advantageously devised in such manner that each of them acts directly upon one of the ends of the corresponding segment or shoe, while the other end of said segment or shoe is actuated through the adjacent segment or shoe, owing to the fact that it bears constantly against the corresponding end of said adjacent segment or shoe.

Supposing that these kinematic means are of the kind including eccentrically mounted parts, they are advantageously made as follows:

Each of these means includes an eccentric sleeve 1, that is to say a sleeve capable of turning about an axis 0 (Fig. 1) which does not coincide with the axis $0^1$ of its cylindrical outer surface. Said sleeve is, for instance carried by a rod 2 the axis of which is at 0, carried by the supporting disc A, which advantageously includes two cheeks 3 and 4, rigid with each other and forming a kind of casing inside which are mounted the various organs of the braking system, the ends of said rods 2 being fixed in said cheeks 3 and 4, respectively.

Each segment or shoe $A^1$ or $A^2$ (which consists essentially of a metallic or other element 5, advantageously stiffened by ribs 6 and carrying a lining of fibre or any other suitable material 7) is rigid, at one of its ends, with a collar 8 which fits around the outer surface of the corresponding sleeve 1.

The supporting element 5 of each segment or shoe includes an inwardly receding portion 9, located close to annular element 8 and the end of the adjacent sleeve or shoe bears against this receding portion.

I might have merely a uni-directional driving of the segments by one another, their ends bearing upon one another as just above explained. In this case, the return of said segments or shoes to the neutral or inoperative position would be obtained by means of springs. But I deem it preferable to have recourse to positive connections, obtained for instance by having collars 8 caught by the ribs of the adjacent segments respectively, as shown at 17.

Advantageously, I interpose between sleeves 1 and the corresponding rods 2, respectively, self-lubricating bearings, for instance graphite bearings 18, but of course lubrication might also be obtained by means of felts.

Being given the system above described (in which the eccentric sleeves are given merely by way of example and could be replaced by other kinematic devices), I further provide means for operating these devices, for instance by suitably connecting them to a pivoting organ coaxial with the wheel. This organ may consist of a kind of ring 10, of suitable rigidity, advantageously including an inner flange 11, mounted with a snug fit on a cylindrical shoulder 12 provided on the supporting disc A, while the outer edge of ring 10 may be guided in grooved rollers 13 mounted on rods 2.

The connection to be provided between this ring 10 and the kinematic means for operating the segments or shoes is preferably devised in such manner that the radial displacements of the segments remain proportional to the angular displacements of ring 10, whereby the braking effort also remains proportional to the effort exerted on ring 10.

This last mentioned condition can easily be complied with by rotating the eccentric sleeves (or the equivalent) 1 through rectilinear fingers or levers 14 the free ends of which are compelled to move in radial guideways 15 (slots, grooves, etc.) provided in annular member 10, the direction of said levers being substantially at right angles to the plane passing through the axes $00^1$.

In the drawing, where levers 14 are shown in the neutral position, it has been supposed that the amplitude of the displacements could be as high as 90°, and even more.

But it should be well understood that the specific arrangement above described is in no way limitative. For instance, the guideways 15 might have any other direction or shape, same as levers 14, if a law different from that above mentioned is chosen.

As for the means to be provided for actuating from a distance annular element 10, they may be of any usual type, said means acting on this ring 10 either directly, for instance through a finger 16, Fig. 2.

It is unnecessary to describe the operation of the device since it results clearly enough from the explanations given above.

The system according to the present invention has the following advantages:

It permits of distributing the pressure in a uniform manner over the linings, this being due chiefly to the fact that, on the one hand, the segments or shoes are of relatively small length and have a perfect radial expansibility, since they are free at one of their ends, bearing merely upon the adjacent segment, and, on the other hand, all the eccentric members are always acted upon in the same manner.

It is therefore possible to fully utilize the linings and, furthermore, to make use, for the braking, of the whole of the inner surface of the drums.

Another advantage is that these drums can be made of lighter weight since the efforts they undergo are uniformly distributed and therefore they are not subjected to unequal wear and tear, which might produce deformations.

Furthermore, it is possible to maintain proportionality between the effort transmitted and the effort to be transmitted, whereby the brake is fully responsive to the action exerted by the driver.

This involves an easy adjustment of the braking device since the adjustment concerns merely the means for transmitting this action to the braking device, these means including only organs which are within reach.

Finally all the parts are simple and can easily be manufactured through repetitive work.

Of course, what has been told concerning the application of the invention to braking devices also applies to clutches or the like.

In a general manner, while I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A device of the class described comprising a brake drum, a plurality of brake shoes disposed within said drum for movement in a radial direction with respect thereto, means for moving said brake shoes coacting with at least one end of each of said brake shoes, said means including eccentrically pivoted sleeves, a control member, and interconnecting means between said first means and said control member, said interconnecting means comprising levers which extend from said sleeves at right angles to the plane of the axes of the outer surface of said sleeve and of the pivot of said sleeve whereby a force exerted by said control member upon said levers causes the transmission of a force to said brake shoes in any operating position of said levers which always bears the same proportion to the force exerted on the levers.

2. A device of the class described comprising a brake drum, a plurality of brake shoes disposed within said drum for movement in a radial direction with respect thereto, means for moving said brake shoes coacting with at least one end of each of said brake shoes, said means including eccentrically pivoted sleeves, said ends of the brake shoes being provided with annular members which surround said eccentrically pivoted sleeves, a control member, and interconnecting means between said first means and said control member, said interconnecting means comprising levers which extend from said sleeves at right angles to the plane of the axes of the outer surface of said sleeve and of the pivot of said sleeve whereby a force exerted by said control member upon said levers causes the transmission of a force to said brake shoes in any operating position of said levers which always bears the same proportion to the force exerted on the levers.

3. A device of the class described having a brake drum, a plurality of brake shoes disposed within said drum for movement in a radial direction with respect thereto, means for moving said brake drums coacting with one end of each of said brake shoes, said means including eccentrically pivoted sleeves, said ends of the brake shoes being provided with annular members which surround said eccentrically pivoted sleeves, the opposite ends of said brake shoes being provided with U-shaped collars which engage with said annular members of the adjoining brake shoes, a control member, and interconnecting means between said first means and said control member, said interconnecting means comprising levers which extend from said sleeves at right angles to the plane of the axes of the outer surface of said sleeve and of the pivot of said sleeve whereby a force exerted by said control member upon said levers causes the transmission of a force to said brake shoes in any operating position of said levers which always bears the same proportion to the force exerted on the levers.

4. A device of the class described having a brake drum, a plurality of brake shoes disposed within said drum for movement in a radial direction with respect thereto, means for moving said brake shoes coacting with at least one end of each of said brake shoes, said means including eccentrically pivoted sleeves, a control member comprising a rotatable ring, and interconnecting means between said first means and said control member, said interconnecting means comprising levers which extend from said sleeves at right angles to the plane of the axes of the outer surface of said sleeve and of the pivot of said sleeve, the free ends of said levers engaging with said control member, whereby a force exerted by said control member upon said levers causes the transmission of a force to said brake shoes in any operating position of said levers which always bears the same proportion to the force exerted on the levers.

5. A device according to claim 4, wherein said control member is provided with a radial guiding means, and said levers slidably engage with said guiding means.

6. A device of the class described comprising a brake drum, a plurality of brake shoes disposed within said drum for movement in a radial direction with respect thereto, a control member comprising a rotatable ring, guiding means upon said control member, means interconnecting said control member and said brake shoes, said interconnecting means comprising levers slidably engaged with said guiding means upon said control member and eccentric means operatively connected with said levers and said brake shoes whereby a force exerted by said control member upon said levers causes the transmission of a force to said brake shoes in any operating position of said levers which always bears the same proportion to the force exerted on the levers.

7. A device of the class described comprising a brake drum, a plurality of brake shoes disposed within said drum for movement in a radial direction with respect thereto, a pivoted lever for each brake shoe, control means for exerting a force on a point of each of said levers along substantially parallel lines for various angular positions of each of said levers, means operatively connected with each of said levers for transmitting such forces to said brake shoes along parallel lines substantially perpendicular to said first parallel lines, said operative connecting means being adapted and arranged to vary the distance between the line of application of the transmitted force and the axis of each lever in direct proportion to the distance between the line of force exerted on each lever and the axis thereof whereby in any operating position of said levers, the force exerted upon said brake shoes always bears the same proportion to the force exerted on the levers by said control means.

JEAN EMILE PETIT.